March 29, 1966 R. C. GREEN ETAL 3,243,606

BIPOLAR CURRENT SIGNAL DRIVER

Filed Nov. 21, 1963

INVENTORS
ROBERT C. GREEN
PAUL RODRIGUEZ
BY Herbert Sommermeyer
ATTORNEY

United States Patent Office 3,243,606
Patented Mar. 29, 1966

3,243,606

BIPOLAR CURRENT SIGNAL DRIVER

Robert C. Green and Paul Rodriguez, St. Paul, Minn., assignors to Sperry Rand Corporation, New York, N.Y., a corporation of Delaware Filed Nov. 21, 1963, Ser. No. 325,349
2 Claims. (Cl. 307—88.5)

This invention relates in general to pulse-type solid-state logic circuits and in particular to such a circuit that provides a first or a second and opposite polarity pulse of sufficient power and waveform characteristics to drive a drive line of a magnetic memory array.

With the advent of the mass production of digital computers, it has become increasingly desirable to utilize large numbers of similar circuits packaged in individual plug-in modules or "card-types." Such circuits have, in the past, been mounted on printed circuit boards with all components affixed thereto in a substantially permanent manner with the entire assembly coupled into the system by mounting in plug-in type rack mounts. With the need for more highly compact packaging techniques, a still further improvement in high density packaging has resulted in a new field of "micro-electronics" which may be defined as that entire body of electronic art which is connected with or applied to the realization of electronic systems from extremely small electronic parts. One technique utilized in this still larger generic field is devoted to "semiconductor integrated circuits" which may be defined as a functional electronic block wherein both active and passive component parts are produced integrally with, and inseparable from, an active substrate. As regions in each block may be caused to behave as conventional circuit elements many diffused resistors and transistors may be fabricated from the same block to provide resistor-transistor coupled logic (RTCL) circuits. The present invention is directed towards such a circuit which can be fabricated within present state of the art capabilities. When associated with a thin ferromagnetic film memory array and combined with other control circuits of the semiconductor integrated circuit art a truly compact computer is realized.

The present invention is directed towards a magnetic memory system whereby a bipolar write pulse is coupled to a drive line of a thin ferromagnetic film array. The load, which consists of one group of films defining a multi-bit word, is coupled across the output of a bipolar pulse driver. Upon proper controlled initiation a unidirectional pulse is coupled to an associated drive line which due to the magnetic coupling sense of the film-drive line arrangement is a positive or a negative pulse, depending upon which end of the drive line the positive pulse is coupled. Consequently, the output is in reality a unipolar pulse in a first or second and opposite direction but has the same effect upon a coupled film as of a bipolar pulse—depending upon the direction of travel of the pulse through the coupled drive line.

Accordingly, it is a primary purpose of this invention to provide a semiconductor integrated circuit capable of providing an effective bipolar drive pulse to a thin ferromagnetic film memory array.

Another object of this invention is to provide a circuit utilizing only resistor-transistor components.

Another object of this invention is to provide a solid-state circuit which can be readily produced by present state of the art semiconductor integrated circuit techniques.

Another object of this invention is to provide a resistor-transistor coupled logic circuit which is readily adaptable to a semiconductor integrated circuit form.

Another object of this invention is to provide a compact bipolar pulse generating drive circuit for a magnetic memory array.

A more general object of this invention is to provide a resistor-transistor coupled semiconductor integrated logic circuit.

These and other more detailed specific objectives will be disclosed in the course of the following specification, reference being had to the accompanying drawings, in which.

Figure 1:
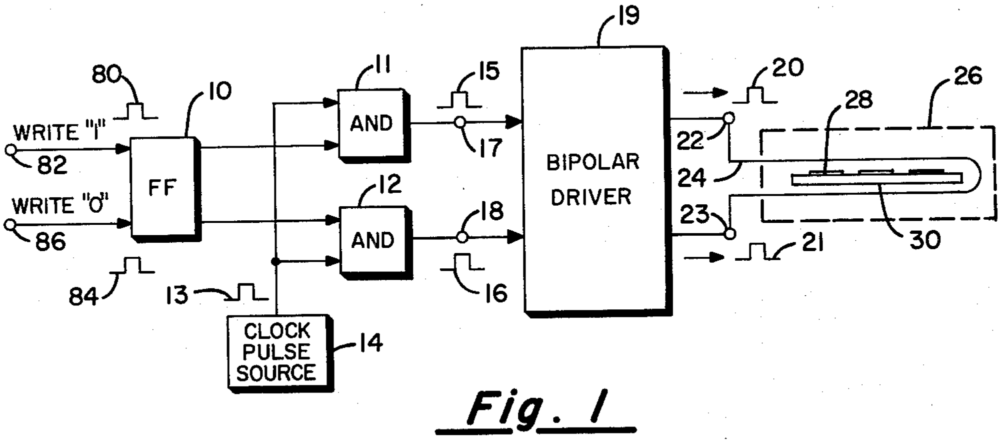
FIG. 1 is a block diagram of a preferred embodiment of the present invention.

With particular reference to FIG. 1 there is disclosed a block diagram of a preferred embodiment of the present invention wherein an effective positive write "1" or negative write "0" pulse is selectively coupled to a bit drive line of a thin ferromagnetic film memory array. In this embodiment flip-flop 10 couples a high level signal to either one of AND gates 11 or 12 and correlatively a low level signal to the other one of AND gates 11 or 12. Gate pulse 13 from clock pulse source 14 is then coupled at the appropriate time to AND gates 11 and 12 enabling that gate that is concurrently coupled by the high level signal from flip-flop 10 with that gate that is concurrently coupled by the low level signal from flip-flop 10 being disabled. The enabled AND gate 11 or 12 in turn couples a write "1" control pulse 15 or a write "0" control pulse 16 to terminals 17 or 18, respectively, of bit driver 19. Depending upon whether AND gate 11 or 12 is enabled a positive write "1" pulse 20 or a positive write "0" pulse 21 is coupled from terminal 22 or 23, respectively, to the bit drive line 24 of memory array 26. Memory array 26 may be composed of a plurality of similar thin ferromagnetic films 28 mounted on substrate 30 and sandwiched between the coupled-back drive line 24. Films 28 may be fabricated in accordance with S. M. Rubens Patent No. 2,900,282 and assembled in a memory array 26 in accordance with S. M. Rubens et al., Patent No. 3,030,612.

Write "1" pulse 20 and write "0" pulse 21 are both positive going pulses but due to the manner of their magnetic coupling to films 28 are effectively positive and negative pulses, respectively. Using the well-known right-hand rule, write "1" pulse 20 travels out from terminal 22 through bit drive line 24 over films 28 and returns under films 28 into terminal 23 producing in the area of films 28 a magnetic field whose direction is in a downward direction with respect to the surface of the drawing of FIG. 1. This field causes films 28 to be written into an arbitrarily defined "1" remanent magnetic state. Conversely, write "0" pulse 21 travels out from terminal 23 through bit drive line 24 under films 28 and returns over films 28 into terminal 22 producing in the area of films 28 a magnetic field that is in an upward direction and opposite to that caused by pulse 20. This field causes films 28 to be written into a "0" remanent magnetic state opposite to the "1" remanent magnetic state. Consequently, driver 19 produces bit drive line pulses that are effectively of a first or of a second and opposite polarity with respect to the coupled memory films.

Figure 2:
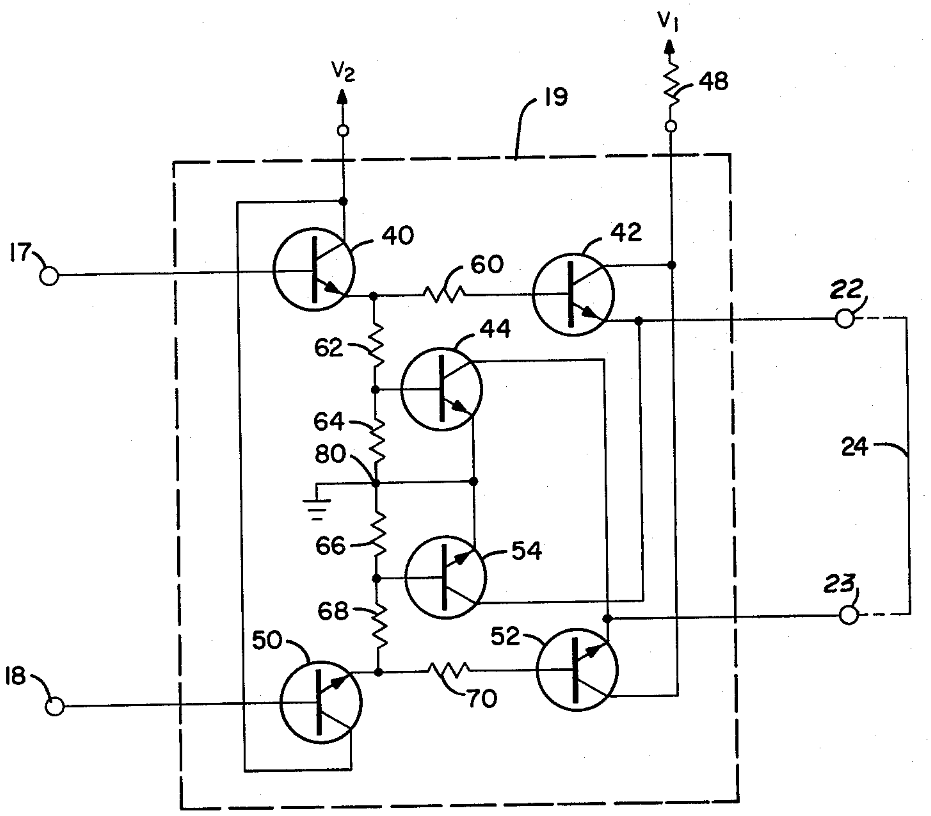
FIG. 2 is a circuit schematic of a preferred embodiment of the present invention.

In order to facilitate an understanding of the operation of this invention, the following group of actual values for the components of FIG. 2 are presented. It should be understood that the principles of operation of this circuit may be present in circuits having a wide range of individual specifications, so that the list of values here presented should not be construed as a limitation.

| Components: | Type No. or identification |
|---|---|
| Resistor 48 | 91 ohms, ±10%, ½ watt. |
| Resistors 62, 68 | 500 ohms, ±20%, ⅛ watt. |
| Resistors 64, 66 | 2K, ±20%, ⅛ watt. |
| Resistors 60, 70 | 330 ohms, ±20%, ⅛ watt. |
| $V_1$, $V_2$ | +10 volts, ±10%. |
| Transistors 40, 42, 44, 50, 52, 54 | 2N834. |

Using the above values, the following signal relationships are utilized:

*Input signal*

(A) Write control signal from enabled AND gate.

(1) With AND gates 11 and 12 unloaded, the amplitude of the write control signals 15 and 16 at terminals 17 and 18, respectively, will not be greater than +6.3 volts nor less than +4.0 volts with respect to ground.

(2) For the control signals 15 and 16 as defined in (1), the output impedance of the AND gates 11 and 12 will be 50 ohms.

(3) The pulse width of the control signals 15 and 16 as defined in (1) will be 1.0 μsec.±0.2 μsec. measured at the 50% amplitude level.

(4) The rise time of the open circuit control signals 15 and 16 will not be greater than 15 nanoseconds measured from the 10% to 90% amplitude levels.

(5) The fall time of the open circuit control signals 15 and 16 will not be greater than 15 nanoseconds measured from the 90% to 10% amplitude levels.

(B) The signal from the disabled AND gate 11 or 12 will be 0.3 volt±0.1 volt.

*Output signal*

(A) The output of the bit driver 19 will be a current pulse of 85 ma. (milliamperes)±15 ma. delivered to a 2 ohm, 1 μh. (microhenry) load across terminals 22 and 23.

(B) The output as defined in (A) above is for resistor 48 equal to 91 ohms. Resistor 48 is placed external to the bit driver 19 between it and voltage source $V_1$ and is intended to provide a means of controlling the output current for different applications.

(C) The rise time of the output current pulse will not be greater than 70 nanoseconds measured from the 10% to the 90% amplitude levels.

(D) The fall time of the output current pulse will not be greater than 70 nanoseconds measured from the 90% to the 10% amplitude levels.

With particular reference to FIG. 2 there is disclosed a circuit schematic of bit driver 19 which is the equivalent of a double-pole double-throw solid-state switch. Conduction of transistor 40 causes transistors 42 and 44 to conduct, initiating current flow from voltage source $V_1$ through resistor 48, transistor 42, bit drive line 24, transistor 44 and to ground. Conversely, conduction of transistor 50 causes transistors 52 and 54 to conduct initiating current flow from voltage source $V_1$ through resistor 48, transistor 52, bit drive line 24, transistor 54 and to ground.

With bit driver 19 coupled to voltage sources $V_1$ and $V_2$ and with no high level signal from AND gates 11 or 12 coupled to terminal 17 or 18, transistors 40, 42, 44, 50, 52 and 54 are reverse biased into the non-conducting mode. Assuming that a "1" is to be written into films 28, a set pulse 80 is coupled to terminal 82 of flip-flop 10 causing flip-flop 10 to couple a high level signal to AND gate 11 and a low level signal to AND gate 12 (if a "0" were to be written into films 28 a clear pulse 84 would be coupled to terminal 86 of flip-flop 10 causing flip-flop

10 to couple a high level signal to AND gate 12 and a low level signal to AND gate 11). At the desired write time a clock pulse 13 is then coupled to AND gates 11 and 12: the high level signal from flip-flop 10 enables AND gate 11 to cause a high level control pulse 15 of approximately 6.0 volts to be coupled to terminal 17 of bit driver 19; the low level signal from flip-flop 10 disables AND gate 12 to cause a low level control pulse of approximately 0.3 volt to be coupled to terminal 18 of bit driver 19.

With the high level control pulse 15 of approximately 6.0 volts coupled to terminal 17 of bit driver 19 and with the low level control signal of approximately 0.3 volt coupled to terminal 18 of bit driver 19, the base-emitter electrode junction of transistor 40 is forward biased into the conducting mode and the base-emitter electrode junction of transistor 50 is reverse biased into the non-conducting mode. The mutually exclusive conducting mode of either transistor 40 or 50 is a necessary concomitant of the proper operation of bit driver 19. To produce this necessary control feature, the two outputs of flip-flop 10, which are relatively high and low D.C. signal levels, are utilized. However, no limitation to the use of a flip-flop control means is intended. It is apparent that with the D.C. signal level control as provided by flip-flop 10 a pulse type gating means such as provided by AND gates 11 and 12 and clock pulse 13 is necessary to provide a pulse type output signal at terminals 22–23. With transistor 50 in a non-conducting mode, transistors 52 and 54 are likewise reverse biased into the non-conducting mode by the grounding of their base electrodes through the biasing arrangement of resistors 66, 68 and 70. Consequently, such transistors are effectively high impedance open-switches to the circuitry coupled to their emitter-collector electrode junctions.

With the base-emitter electrode junction of transistor 40 forward biased into the conducting mode base drive current flows from voltage source $V_2$ across the collector-emitter electrode junction of transistor 40 through serially arranged resistors 62 and 64 and to a source of ground potential at node 80. This base drive current forward biases the base-emitter electrode junctions of transistor 42 (through resistor 60) and transistor 44 causing the base-emitter electrode junctions of such transistors to be forward biased into the conducting mode. With such transistors biased into the conducting mode, their collector-emitter electrode junctions are effectively low impedance closed-switches to the circuitry coupled through their collector-emitter electrode junctions. With the solid state switches formed by the collector-emitter electrode junctions of transistors 42 and 44 closed, current pulse 20 flows from voltage source $V_1$ through current limiting resistor 48 across the collector-emitter electrode junctions of transistor 42, through bit drive line 24 across terminals 22–23, across the collector-emitter electrode junction of transistor 44 and to a source of ground potential at node 80. Consequently, the enabling of AND gate 11 by gate pulse 13 has caused a positive pulse 20, whose duration is substantially defined by gate pulse 13, to flow through bit drive line 24 causing films 28 to be placed into a "1" remanent magnetic state. It is apparent, due to the symmetry of the circuit of bit driver 19, that the enabling of AND gate 12 by gate pulse 13 a high level control pulse 16 of approximately 6.0 volts is coupled to terminal 18 and bit driver 19—with the concurrent coupling of a low level contol signal of approximately 0.3 volt to terminal 17 of bit driver 19—causes a positive pulse 21 to flow from voltage source $V_1$ through current limiting resistor 48, across the collector-emitter electrode junction of transistor 52, through bit drive line 24 across terminals 23–22 (in the opposite direction of pulse 20), across the collector-emitter electrode junction of transistor 54 and to a source of ground potential at node 80. Consequently, the enabling of AND gate 12 by gate pulse 13 has caused a positive pulse 21, whose duration is substantially defined by gate pulse 13, to flow through bit drive line 24 causing films 23 to be placed into a "0" remanent magnetic state.

Thus, it is apparent that there has been disclosed herein a preferred embodiment of the present invention that provides a circuit capable of being readily produced as a semiconductor integrated circuit providing effective bipolar pulses to a thin ferromagnetic film memory array drive line.

When two or more components are described in the specification and claims herein as being "directly coupled," or, "directly intercoupled" such terms shall mean that no discrete resistive, capacitive, or inductive electrical component shall be electrically intermediate such directly coupled or directly intercoupled components.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A bipolar current signal driver, comprising:
a pair of input terminals;
a pair of output terminals;
first, second and third pairs of similar conductivity type transistors, each transistor having a base, an emitter and a collector electrode;
the base electrode of one transistor of the first pair coupled to one of the input terminals and the base electrode of the other transistor of said first pair coupled to the other input terminal;
first resistor means coupling the base electrode of one transistor of the third pair to the emitter electrode of the one transistor of said first pair;
second resistor means coupling the base electrode of one transistor of the second pair to the emitter electrode of the one transistor of said first pair;
third resistor means coupling the base electrode of the other transistor of the third pair to the emitter electrode of the other transistor of said first pair;
fourth resistor means coupling the base electrode of the other transistor of the second pair to the emitter electrode of the other transistor of said first pair;
means for directly intercoupling the collector electrodes of the transistors of said third pair for receiving a first reference voltage;
means for directly intercoupling the emitter electrodes of the transistors of said second pair for receiving a second reference voltage;
means for directly intercoupling the collector electrodes of the transistors of said first pair for receiving a third reference voltage;
means for coupling the emitter electrode of the one transistor of said third pair to a first one of said output terminals;
means for coupling the collector electrode of the one transistor of said second pair to said second output terminal;
means for coupling the emitter electrode of the other transistor of said third pair to the second of said output terminals; and,
means for coupling the collector electrode of the other transistor of said second pair to said first output terminal.

2. The driver of claim 1 further including:
fifth resistor means intercoupling the base and emitter electrodes of the one transistor of said second pair; and,
sixth resistor means intercoupling the base and emitter electrodes of the other transistor of said second pair.

References Cited in the file of this patent

UNITED STATES PATENTS

| | | | |
|---|---|---|---|
| 2,758,160 | 8/1956 | Baskin et al. | |
| 2,821,639 | 1/1958 | Bright et al. | 307—88.5 |
| 2,872,582 | 2/1959 | Norton | 307—88.5 X |
| 2,930,985 | 3/1960 | Basharrah | 330—30 X |
| 2,972,710 | 2/1961 | D'Amico | 307—88.5 X |
| 3,018,445 | 1/1962 | Stone | 330—18 |
| 3,050,688 | 8/1962 | Heyser | 330—18 X |
| 3,051,854 | 8/1962 | Weber | 307—88.5 |
| 3,078,379 | 2/1963 | Plogstedt et al. | 307—88.5 |
| 3,087,015 | 4/1963 | Witzke | 330—146 X |
| 3,173,022 | 3/1965 | Kunsch | 307—88.5 |
| 3,174,058 | 3/1965 | Xylander | 307—88.5 |
| 3,191,121 | 6/1965 | Nelson. | |

FOREIGN PATENTS

| | | |
|---|---|---|
| 1,142,633 | 1/1963 | Germany. |

ARTHUR GAUSS, *Primary Examiner.*

I. C. EDELL, *Assistant Examiner.*